(12) United States Patent
Herrmann et al.

(10) Patent No.: US 11,228,605 B2
(45) Date of Patent: Jan. 18, 2022

(54) METHOD AND DEVICE FOR HANDLING AN ANOMALY IN A COMMUNICATION NETWORK

(71) Applicant: Robert Bosch GmbH, Stuttgart (DE)

(72) Inventors: Michael Herrmann, Düsseldorf (DE); Janin Wolfinger, Stuttgart (DE); Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 244 days.

(21) Appl. No.: 16/424,889

(22) Filed: May 29, 2019

(65) Prior Publication Data

US 2019/0387010 A1 Dec. 19, 2019

(30) Foreign Application Priority Data

Jun. 13, 2018 (DE) .......................... 102018209407.1

(51) Int. Cl.
*H04L 29/06* (2006.01)
*H04L 12/26* (2006.01)
*H04L 29/08* (2006.01)

(52) U.S. Cl.
CPC .......... *H04L 63/1425* (2013.01); *H04L 43/08* (2013.01); *H04L 67/12* (2013.01)

(58) Field of Classification Search
CPC ....... H04L 2012/40215; H04L 63/1425; H04L 63/1416; H04L 2209/84; H04L 63/1466; H04L 12/403; H04L 1/0057; H04L 1/0061; H04L 41/0659; H04L 43/08; H04L 43/0847; H04L 63/14; H04L 63/1441; H04L 63/1458; H04L 67/12; H04L 63/1483; G05B 23/0275; G05B 19/048; G05B 2219/24015; G05B 9/02; G06F 11/079; G06F 11/0793; G06F 11/26; G06F 21/55; G06Q 10/20; H04W 4/38

See application file for complete search history.

(56) References Cited

U.S. PATENT DOCUMENTS

| | | | | |
|---|---|---|---|---|
| 2014/0380416 | A1* | 12/2014 | Adachi | H04L 63/20 726/2 |
| 2015/0200964 | A1* | 7/2015 | Kariman | H04L 63/18 726/3 |
| 2015/0213369 | A1* | 7/2015 | Brandt | G06N 20/00 706/12 |
| 2016/0153806 | A1* | 6/2016 | Ciasulli | G06Q 10/04 702/184 |
| 2017/0135175 | A1* | 5/2017 | Sugimoto | H05B 47/175 |
| 2017/0244594 | A1* | 8/2017 | Shiota | H04L 41/0668 |

(Continued)

FOREIGN PATENT DOCUMENTS

| | | |
|---|---|---|
| DE | 102017210787 A1 | 12/2018 |
| DE | 102017213119 A1 | 1/2019 |

*Primary Examiner* — Backhean Tiv
*Assistant Examiner* — Linh T. Nguyen
(74) *Attorney, Agent, or Firm* — Norton Rose Fulbright US LLP; Gerard Messina

(57) ABSTRACT

A device and method for handling an anomaly in a communication network of a motor vehicle includes at least one detector analyzing a data stream in the communication network, recognizing at least one anomaly using a rule-based anomaly recognition method if at least one parameter for a data packet of the data stream deviates from a target value, and sending information about the at least one recognized anomaly via the communication network.

14 Claims, 3 Drawing Sheets

(56) References Cited

U.S. PATENT DOCUMENTS

| | | | |
|---|---|---|---|
| 2018/0040172 A1* | 2/2018 | Funk | H04W 12/122 |
| 2018/0108188 A1* | 4/2018 | Canning | H04Q 9/00 |
| 2018/0302422 A1* | 10/2018 | Kishikawa | H04L 9/3271 |
| 2019/0056707 A1* | 2/2019 | Pollard | B64F 5/60 |
| 2019/0379683 A1* | 12/2019 | Overby | H04L 29/06 |
| 2019/0385057 A1* | 12/2019 | Litichever | H04L 63/14 |
| 2020/0387605 A1* | 12/2020 | Gilad | G06F 21/566 |
| 2021/0002088 A1* | 1/2021 | Kobayashi | B65G 61/00 |
| 2021/0075800 A1* | 3/2021 | Paraskevas | H04W 4/48 |

* cited by examiner

METHOD AND DEVICE FOR HANDLING AN ANOMALY IN A COMMUNICATION NETWORK

CROSS-REFERENCE TO RELATED APPLICATIONS

The present application claims priority under 35 U.S.C. § 119 to DE 10 2018 209 407.1, filed in the Federal Republic of Germany on Jun. 13, 2018, the content of which is hereby incorporated by reference herein in its entirety.

FIELD OF THE INVENTION

The present invention relates to a method and a device for handling an anomaly in a communication network, to a computer program, and to a machine-readable storage medium.

BACKGROUND

Methods for anomaly recognition are known from non-published DE 10 2017 210 787 and DE 10 2017 213 119. These methods require dedicated components and a static architecture that has to be added to a communication network structure that is to be monitored.

SUMMARY

In contrast to these, it is desirable to provide an improved method and an improved device. This is achieved by a method and a device according to example embodiments of the present invention.

In connection with aspects of the following statements, in the following deviations from normal behavior that can occur for various reasons during real operation in data of a system for communication of the data can be designated anomalies. Causes of these can for example be of the following types: defective or completely failed sensors supply false data or no data; components of the system are damaged; and/or the system has been manipulated by an external source (e.g., a hacker attack).

The recognition of anomalies in data that is being communicated, in the case of both internal and external communication, is realized by a Network-based Intrusion Detection System, or NIDS. In the following, NIDS refers to a system that monitors and analyzes all the data traffic in the communication network in order to recognize all anomalies in the internal and external data exchange. A NIDS that has been extended by a component for preventing or reacting to recognized anomalies is referred to in the following as a Network-based Intrusion Detection and Prevention System, or NIDPS.

Conventional NIDS or NIDPS are realized by dedicated hardware. Either the data traffic is forwarded to a separate NIDS or NIDPS component by a central switch, or selected switches are expanded by separate NIDS or NIDPS components. In the first solution, particularly fast switch ports are used in order to forward as much data traffic as possible to the NIDS or NIDPS. The second solution uses a NIDS or NIDPS functionality directly at the switch.

In contrast, according to an example embodiment of the present invention, a method for handling an anomaly in a communication network, in particular in a motor vehicle, provides that at least one detector analyzes a stream of data in the communication network, the at least one detector recognizing at least one anomaly using a rule-based anomaly recognition method if at least one parameter for a data packet of the data stream deviates from a target value, the at least one detector sending information about at least one recognized anomaly via the communication network. Detectors are recognition components for rule-based anomaly recognition. These recognition components realize a core task of an attack recognition system, in particular a NIDS. The communication of the detector via the communication network enables a separation of the recognition component and its situation at various devices in the monitored communication network itself. In this way, a separate NIDS is realized for example in an automotive Ethernet network. Through the separation, there results a unit that is small with regard to memory requirement or requirement of computing resources, which can be situated at a control device in the automotive Ethernet network in addition to its other tasks. The communication takes place via the existing communication network. Dedicated hardware for the detector or an additional communication infrastructure are not required.

Advantageously, it is provided that at least one actuator receives information about at least one anomaly recognized by at least one detector via the communication network, and the at least one actuator initiates at least one countermeasure for handling the anomaly as a function of the information about the at least one anomaly recognized by the at least one detector. Actuators are a reaction component for rule-based anomaly recognition and handling. This component realizes another core task of the attack recognition system. The communication between the detector and actuator via the communication network enables a separation of these components among different devices in the monitored communication network itself. In this way, a separate NIDPS is realized for example in the automotive Ethernet network, in which it is possible to react immediately to recognized anomalies. Dedicated hardware or an additional communication infrastructure are not required for this.

Advantageously, it is provided that at least one aggregator receives information about at least one recognized anomaly from at least one detector and sends information about the at least one recognized anomaly to at least one actuator via the communication network. The aggregator is a further component, the aggregation component, which collects information about recognized anomalies from detectors from various subnetworks of the communication network or from various detectors of the communication network and forwards it to actuators. This makes it possible to exchange information about anomalies in different subnetworks. For this purpose, the aggregator is situated for example at a connection point of the subnetworks in the communication network.

Advantageously, it is provided that at least two detectors analyze data packets of the data stream at various devices in the communication network and/or in the same subnetwork. In this way, a core task of the recognition, i.e., the recognition component, is carried out in this subnetwork in distributed fashion at a plurality of devices. This reduces the need for computing power, working memory, and/or memory at the individual devices at which the respective detector is realized.

Advantageously, it is provided that at least two actuators situated at different devices in the communication network and/or at different devices in two different subnetworks of the communication network initiate at least one countermeasure. In this way, the core task of reaction, i.e., the reaction component, is carried out in distributed fashion in the communication network. In this way, the reaction takes place immediately at the device. Additional dedicated hardware is not required.

Advantageously, it is provided that at least two aggregators situated at different devices in the communication network and/or at different devices in two different subnetworks of the communication network aggregate information about recognized anomalies, a further aggregator aggregating this information about recognized anomalies from the at least two aggregators. This is a hierarchical aggregation in a hierarchical communication network. In this way, complex hierarchical structures of the communication network can be monitored particularly efficiently.

Advantageously, it is provided that an interface communicates recognized anomalies in particular to a backend and/or receives instructions in particular from a backend. A further core task, the communication with the backend, i.e., the provision of information about recognized anomalies, is realized in this way. Instructions that are derived for example from a user or in automated fashion from the recognized anomalies can be traced back in this way. This makes it possible to carry out calculations that are expensive with regard to computing time, memory space, or working memory outside the communication network to be monitored, or to influence them from outside the communication network to be monitored.

Advantageously, it is provided that the data stream between control devices within at least one subnetwork of the communication network is analyzed in a detector that is situated at one of these control devices, and/or that the data stream between control devices from different subnetworks of the communication network, connected to one another via a gateway or control device, is analyzed by a detector that is situated at the gateway or at this control device. In this way, a hierarchical monitoring is possible. This configuration is particularly advantageous in motor vehicles having strongly hierarchical communication networks.

Advantageously, it is provided that at least one detector and/or at least one aggregator is realized inside at least one subnetwork of the communication network in distributed fashion over a plurality of control devices, and/or in distributed fashion at least one control device and at least one gateway. This distributed realization enables use at control devices or gateways with a low requirement of computing resources, for example on embedded hardware.

It is advantageously provided that one of the actuators sends a plurality of further actuators instructions concerning at least one countermeasure via the communication network. Through this hierarchical configuration of the actuators, the countermeasure is carried out in coordinated fashion.

An example embodiment of the present invention is directed to a computer program set up to carry out such a method when it is executed on a computer. An example embodiment of the present invention is directed to a machine-readable storage medium on which the computer program is stored.

With regard to the device for handling the anomaly in the communication network, it is provided that at least one detector is set up to analyze a data stream in the communication network, the at least one detector being set up to recognize at least one anomaly, using a rule-based anomaly recognition method, if at least one parameter for a data packet of the data stream deviates from a target value, the at least one detector being set up to send information about at least one recognized anomaly via the communication network. In this way, the detection of the anomalies in a communication network can be integrated into embedded hardware that is already present there.

Advantageously, at least one actuator is set up to receive information via the communication network about at least one anomaly recognized by the detector, the at least one actuator being set up to initiate at least one countermeasure for handling the anomaly on the basis of the information about the at least one anomaly recognized by the detector. In this way, the reaction to anomalies in a communication network can be integrated into embedded hardware that is already present.

Advantageously, at least one aggregator is set up to receive information about at least one recognized anomaly from at least one detector and to send information about the at least one recognized anomaly to at least one actuator via the communication network. This is a realization of the device that is especially suitable in particular for hierarchical communication networks.

Further example embodiments result from the following description and the drawings.

DETAILED DESCRIPTION

In the following, aspects of a device for handling an anomaly in a communication network are described in relation to a communication network designed according to a version of Ethernet standard IEEE 802.3. Use in other communication networks is also possible.

Figure 1:
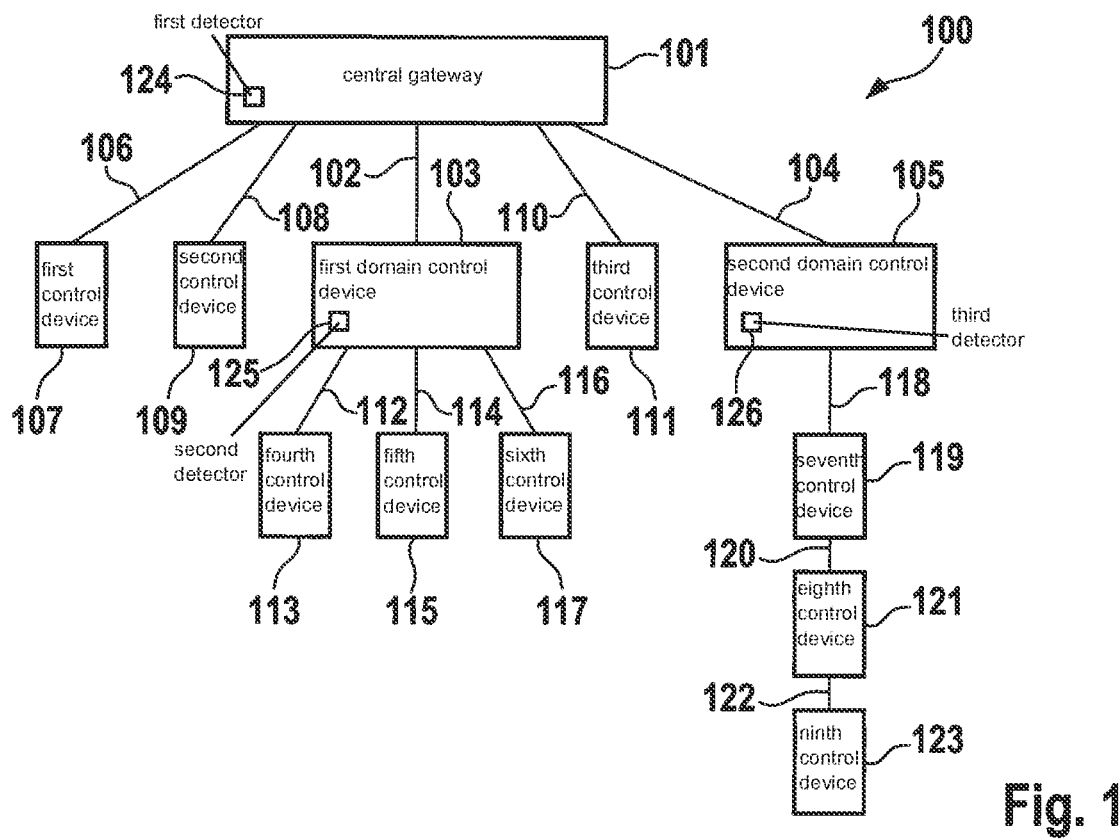
FIG. 1 schematically shows parts of a communication network according to a first example embodiment.

FIG. 1 schematically shows parts of such a communication network 100 according to a first example embodiment for a motor vehicle. Communication network 100 is hierarchical in design and includes a central gateway 101 that is connected directly to a first domain control device 103 via a first Ethernet connection 102 and is connected directly to a second domain control device 105 via a second Ethernet connection 104. Gateway 101 is connected directly to a first control device 107 via a third Ethernet connection 106. Gateway 101 is connected directly to a second control device 109 via a fourth Ethernet connection 108. Gateway 101 is connected directly to a third control device 111 via a fifth Ethernet connection 110. The gateway and these control devices form a first subnetwork of communication network 100, whose parts can communicate with one another only via gateway 101.

First domain control device 103 is connected directly to a fourth control device 113 via a sixth Ethernet connection 112. First domain control device 103 is connected directly to a fifth control device 115 via a seventh Ethernet connection 114. First domain control device 103 is connected directly to a sixth control device 117 via an eighth Ethernet connection 116. These control devices form a second subnetwork whose parts can communicate with one another only via first domain control device 103.

Second domain control device 105 is connected directly to a seventh control device 119 via a ninth Ethernet connection 118. Seventh control device 119 is connected directly to an eighth control device 121 via a tenth Ethernet connection 120. Eighth control device 122 is connected directly to a ninth control device 123 via an eleventh Ethernet connection 122. Ninth control device 123 is connected to second domain control device 105 via eighth control device 121 and seventh control device 119. These control devices form a third subnetwork.

Regarding the connections, direct connections are those via which data can be transmitted without the intermediate connection of additional gateways, switches, or control devices between the ends of the connection directly connected to each other.

The gateway and the control devices include processors, memories, working memories, and interfaces for communication via communication network 100. In the memory of each of the control devices, instructions are stored upon whose execution by the processor, in addition to the communication via Ethernet connections, specific tasks are carried out by the control devices, for the operation of the motor vehicle in the example. The gateway processes instructions for the data connection of the control devices. The communication results in a data stream that includes data packets. In a normal state, target values will be met, for example with regard to timestamps, frequency of occurrence, or frequency of particular data packets. The data packets are exchanged between the control devices in order to fulfill the specific tasks.

A domain control device, and the control devices connected directly to the domain control device, form for example a subnetwork of specific control devices having a common higher-order task. For this purpose, data packets are for example sent only in this subnetwork.

In the subnetwork of a domain control device, Ethernet can be used, in particular automotive Ethernet, or some other bus system typical for automotive use can be used, such as a Controller Area network, or CAN, bus.

For the handling of anomalies in communication network 100, regardless of the standard used, a separation is provided of four core tasks of the NIDPS, namely recognition, aggregation, reaction, and communication, among different control devices, optionally all control devices, within communication network 100. This is done with the goal of realizing a NIDPS exclusively using already-existing resources.

A recognition component, for example a detector or a plurality of detectors, analyzes the data stream and recognizes anomalies when a deviation from the target value occurs.

An aggregation component, for example an aggregator or a plurality of aggregators, receives information about recognized anomalies, e.g., a network status. From this, an overall view of the subnetwork can be generated that evaluates the recognized anomalies. In addition, it is possible for aggregation components to send messages about anomalies and information to a further aggregation component, so that the aggregation takes place over a plurality of stages.

A reaction component, for example an actuator or a plurality of actuators, can initiate countermeasures on the basis of recognized anomalies. The recognized anomalies are communicated to the reaction components partly directly by the recognition component and partly by the aggregation component. Countermeasures can be active reactions, e.g., modifying or rejecting Ethernet packets, blocking ports, or excluding network participants, or passive reactions such as informing or warning other network participants.

A first example embodiment relates to the separation of the recognition component. In the first example embodiment, as shown in FIG. 1, a first detector 124 is provided. First detector 124 is a part of the recognition component of the NIDPS that is realized at gateway 101. First detector 124 analyzes the data stream of the first subnetwork as completely as possible, and, using rule-based anomaly recognition, recognizes an anomaly if at least one parameter for a data packet of the data stream in the first subnetwork deviates from a target value. First detector 124 sends information about a recognized anomaly via communication network 100.

In the first example embodiment, as shown in FIG. 1, a second detector 125 is provided. Second detector 125 is a part of the recognition component of the NIDPS that is realized on first domain control device 103 in addition to its specific task. Second detector 125 analyzes the data stream of the second subnetwork as completely as possible, and, using a rule-based anomaly recognition, recognizes an anomaly if at least one parameter for a data packet of the data stream in the second subnetwork deviates from a target value. Second detector 125 sends information about a recognized anomaly via communication network 100.

In the first example embodiment, as shown in FIG. 1, a third detector 126 is provided. Third detector 126 is a part of the recognition component of the NIDPS that is realized on second domain control device 105 in addition to its specific task. Third detector 126 analyzes the data stream of the third subnetwork as completely as possible, and, using a rule-based anomaly recognition, recognizes an anomaly if at least one parameter for a data packet of the data stream in the third subnetwork deviates from a target value. Third detector 126 sends information about a recognized anomaly via communication network 100.

The other components of the NIDPS are for example situated centrally on one of the other control devices.

This distributed realization of the recognition component ensures that the network traffic of each subnetwork can be analyzed as completely as possible. This is realized according to the first example embodiment by an individual recognition component within each subnetwork.

Depending on the size of the subnetwork and the volume of network traffic, the analysis of the overall network traffic of the subnetwork can still be too resource-intensive. For this reason, according to a second example embodiment the recognition component can be further distributed within a subnetwork.

Here, the recognition functionality is individually adapted to the resources of the control devices that are available. Some or all control devices of the subnetwork can accordingly together take over the realization of the recognition component.

Figure 2:
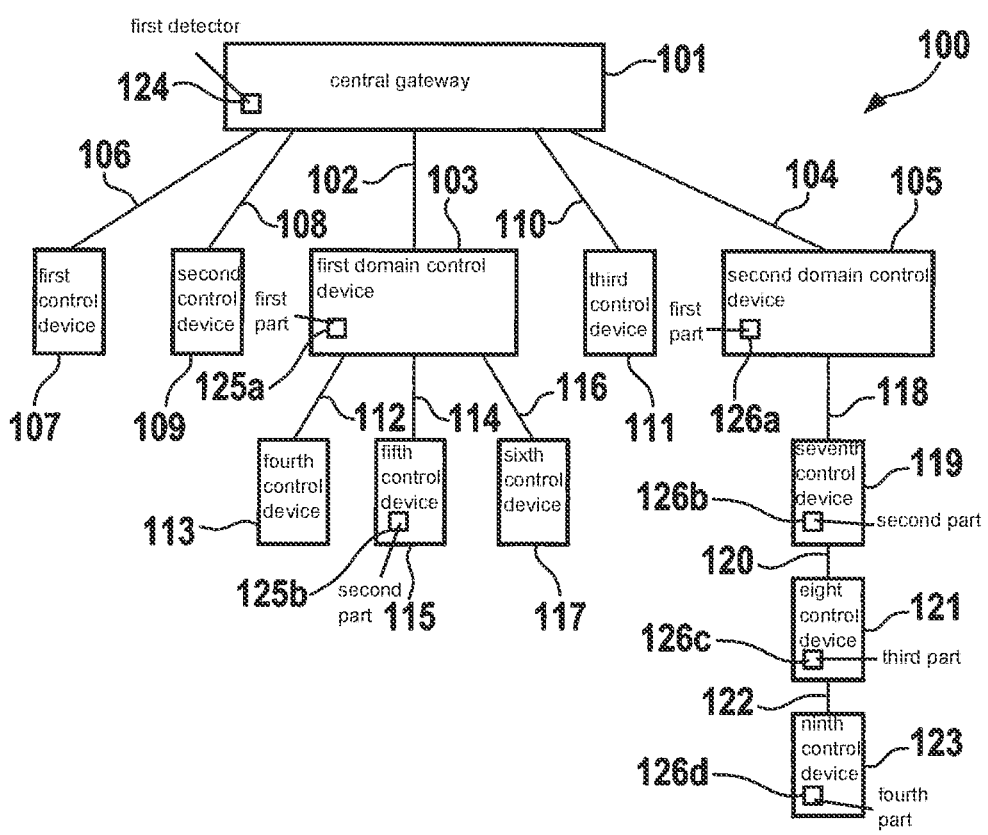
FIG. 2 schematically shows parts of a communication network according to a second example embodiment.

A second example embodiment relates to a distribution of the separated recognition component. In the case of the second subnetwork, according to the second example embodiment shown in FIG. 2, this is realized in that second detector 125 is realized as a distributed detector having a part 125a at first domain control device 103 and another part 125b at fifth control device 115. In the case of the third subnetwork, according to the second example embodiment this is realized in that third detector 126 is realized as a distributed detector having a first part 126a at second domain control device 105, a second part 126b at seventh control device 119, a third part 126c at eighth control device 121, and a fourth part 126d at ninth control device 123.

The recognition in the first subnetwork is realized by a single detector 124 at gateway 101. The recognition in the second subnetwork is distributed over two control devices. In the third subnetwork, all control devices take part in the recognition.

The other components of the NIDPS are for example situated centrally on one of the other control devices.

The other parts of the second example embodiment are realized identically to the first example embodiment. For a description in this regard of the second example embodiment, reference is made to the description of the first example embodiment.

A third example embodiment relates to a separation of the aggregation component. Here the aggregation component includes a plurality of aggregators that are configured in communication network 100 so as to be individually adapted to the resources of the available control devices. Accordingly, some or all control devices of a subnetwork can together take over the realization of the aggregation component.

Figure 3:
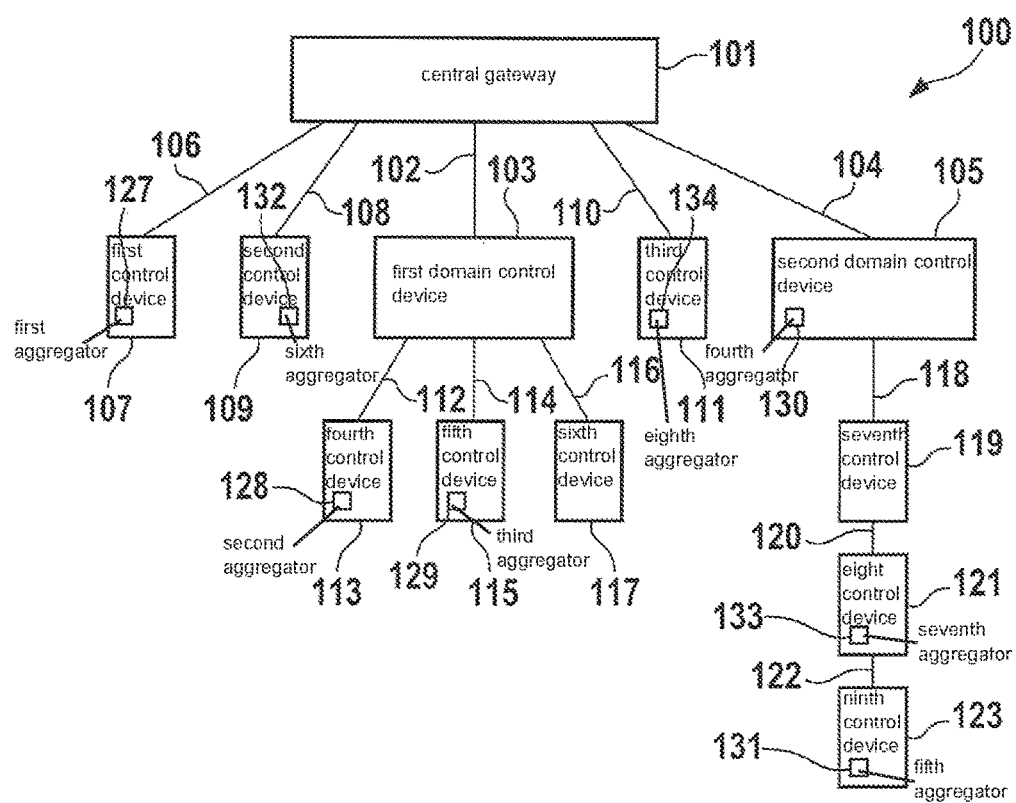
FIG. 3 schematically shows parts of the communication network according to a third example embodiment.

For a multi-stage aggregation, aggregators are used wherever it is possible and appropriate. The placement of these aggregators is completely independent of a network topology of communication network 100. A possible distribution of the multi-stage aggregators is shown in FIG. 3.

A first aggregator 127 is situated at first control device 107. The instructions for first aggregator 127 run in addition to the tasks that are executed on first control device 107 for the operation of the motor vehicle.

A second aggregator 128 is situated at fourth control device 113. The instructions for second aggregator 128 run in addition to the tasks that are executed on fourth control device 113 for the operation of the motor vehicle.

A third aggregator 129 is situated at fifth control device 115. The instructions for third aggregator 129 run in addition to the tasks that are executed on fifth control device 115 for the operation of the motor vehicle.

A fourth aggregator 130 is situated at second domain control device 105. The instructions for fourth aggregator 130 run in addition to the tasks that are executed on second domain control device 105 for the operation of the motor vehicle.

A fifth aggregator 131 is situated at ninth control device 123. The instructions for fifth aggregator 131 run in addition to the tasks that are executed on ninth control device 123 for the operation of the motor vehicle.

First aggregator 127, second aggregator 128, third aggregator 129, fourth aggregator 130, and fifth aggregator 131 form a first stage of the aggregation. The aggregators of the first stage send aggregated information about recognized anomalies for example as a network state to aggregators of a second stage.

In the example, the second stage is formed by a sixth aggregator 132 situated at second control device 109 and by a seventh aggregator 133 situated at eighth control device 121. The instructions for sixth aggregator 132 run in addition to the tasks that are executed on second control device 109 for the operation of the motor vehicle. The instructions for seventh aggregator 133 run in addition to the tasks that are executed on eighth control device 121 for the operation of the motor vehicle.

The aggregators of the second stage aggregate the information from the aggregators of the first stage, and send this aggregated information about recognized anomalies to at least one aggregator of a third stage. In the example, an eighth aggregator 134, situated at third control device 111, is provided in the third stage. The instructions for eighth aggregator 134 run in addition to the tasks that are executed on third control device 111 for the operation of the motor vehicle.

The other components of the NIDPS are for example situated centrally on one of the other control devices.

In other regards, communication network 100 is realized as in the first example embodiment. For a description in this regard of the third example embodiment, reference is made to the description of the first example embodiment.

Figure 4:
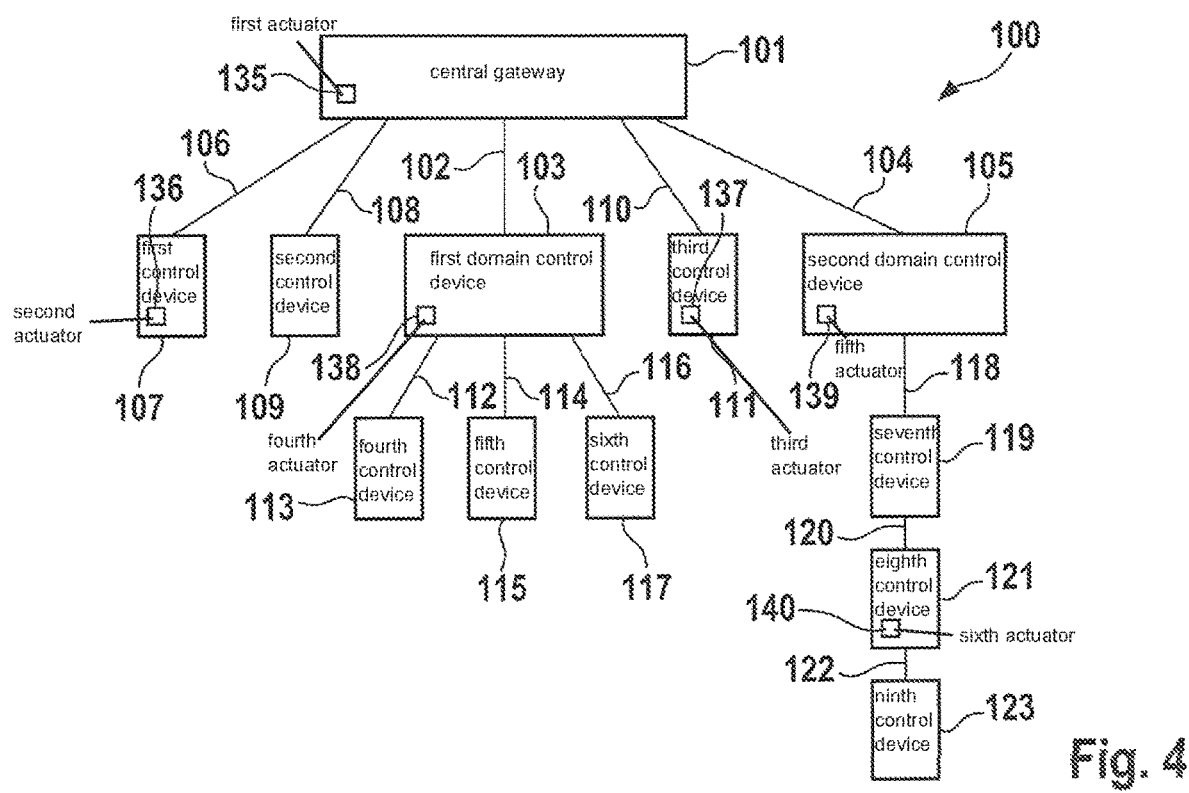
FIG. 4 schematically shows parts of a communication network according to a fourth example embodiment.

A fourth example embodiment relates to a separation of the reaction component. Here, as shown in FIG. 4, the reaction component includes a plurality of actuators that are configured in communication network 100 so as to be individually adapted to the resources of the available control devices. Some or all control devices of a subnetwork can accordingly take over the realization of the reaction component.

In the example, the actuators are grouped according to the subnetworks. In the first subnetwork, a first actuator 135 is situated in gateway 101. The instructions for first actuator 135 run in addition to the tasks that are executed on gateway 101 for the operation of the motor vehicle. In the first subnetwork, a second actuator 136 is situated in first control device 107. The instructions for second actuator 136 run in addition to the tasks that are executed on first control device 107 for the operation of the motor vehicle. In the first subnetwork, a third actuator 137 is situated in third control device 111. The instructions for third actuator 137 run in addition to the tasks that are executed on third control device 111 for the operation of the motor vehicle.

In the second subnetwork, a fourth actuator 138 is situated in first domain control device 103. The instructions for fourth actuator 138 run in addition to the tasks that are executed on first domain control device 103 for the operation of the motor vehicle.

In the third subnetwork, a fifth actuator 139 is situated in second domain control device 105. The instructions for fifth actuator 139 run in addition to the tasks that are executed on second domain control device 105 for the operation of the motor vehicle. In the third subnetwork, a sixth actuator 140 is situated in eighth control device 121. The instructions for sixth actuator 140 run in addition to the tasks that are executed on eighth control device 121 for the operation of the motor vehicle.

The other components of the NIDPS are for example situated at one of the other control devices. In other respects, communication network 100 is realized as described in the first example embodiment.

A fifth example embodiment relates to a separation and distribution of all core tasks of the NIDPS. Based on the distribution of all core tasks of the NIDPS, it is possible to immediately react to recognized anomalies in a particularly efficient manner. Due to the use of the existing hardware, no additional costs result.

Figure 5:
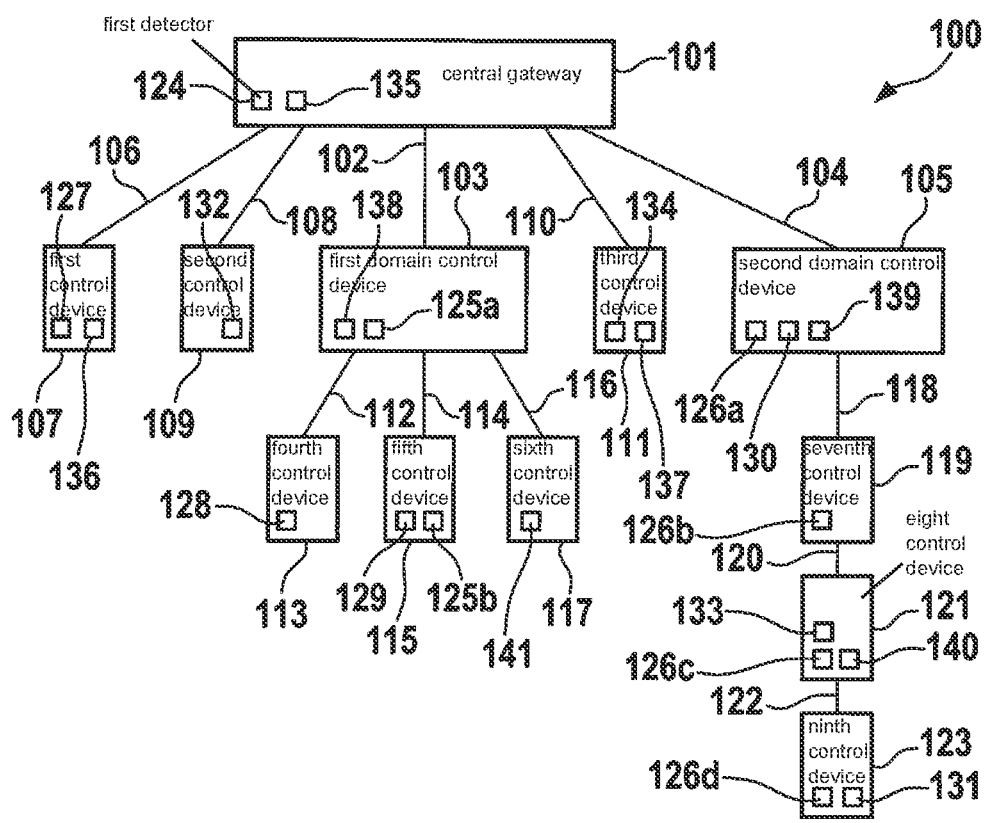
FIG. 5 schematically shows parts of a communication network according to a fifth example embodiment.

As shown in FIG. 5, the detectors, aggregators, and actuators described above are configured and realized separately and in distributed fashion. First detector 124 and first actuator 135 are situated at gateway 101. First aggregator 127 and second actuator 136 are situated at first control device 107. Sixth aggregator 132 is situated at second control device 109. Eighth aggregator 134 and third actuator 137 are situated at third control device 111. Second aggregator 128 is situated at fourth control device 113. Third aggregator 129 is situated at fifth control device 115. Fourth actuator 138 is situated at first domain control device 103.

Third detector 126 and fifth actuator 139 are situated at second domain control device 105.

The distributed detector in the second subnetwork is realized with part 125a at first domain control device 103 and with the other part 125b at fifth control device 115. The distributed detector in the third subnetwork is realized with first part 126a at second domain control device 105, with second part 126b at seventh control device 119, with third part 126c at eighth control device 121, and with fourth part 126d at ninth control device 123.

A communication component 141 is situated at sixth control device 117. Communication component 141 takes over the communication of the NIDPS to the backend. It provides information about recognized anomalies and the network state to the backend, and receives instructions from the backend.

Each above-described NIDPS core task of the NIDPS can be realized separately and completely by one of the control devices. It is also possible for this core task to be distributed over a plurality of control devices. The suitability of a control device for partly or completely taking over a core task of the NIDPS can be ascertained on the basis of properties such as available free resources, position in the network topology, or existing communication interfaces.

In the fifth example embodiment, such a separation and distribution of all core tasks within an automotive network is shown as an example. All control devices and the gateway are involved in the realization, and have been assigned different task parts. This distribution shown as an example can be adapted to the available resources of any other architecture, and in this way can be individually realized.

The data stream between control devices is analyzed for example by a detector within at least one subnetwork of the communication network. The data stream between control devices from various subnetworks of the communication network, connected to one another via a gateway or control device, is analyzed for example by a detector that is situated at the gateway or at this control device.

In general, core tasks of the NIDPS are separated. In addition, a detector and/or at least one aggregator within at least one subnetwork of the communication network can be realized in distributed fashion over a plurality of control devices or in distributed fashion at at least one control device and at least one gateway.

Figure 6:
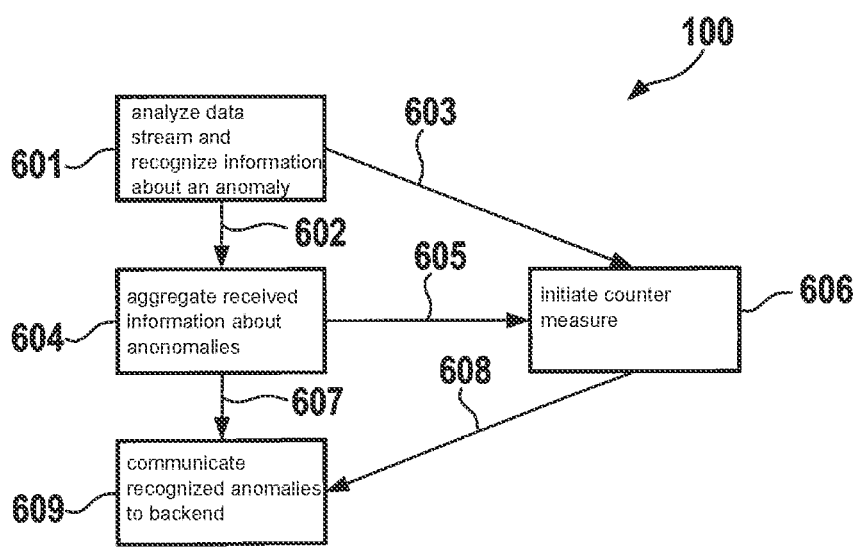
FIG. 6 schematically shows parts of a data flow in a communication network according to an example embodiment of the present invention.

A data flow within the NIDPS is shown schematically in FIG. 6. The detectors act together as recognition component. The aggregators act together as aggregation component. The actuators act together as reaction component. The communication component communicates with the backend.

In a step 601, the data stream is analyzed by the recognition component and information about an anomaly is recognized. For example, as shown in the second and fifth example embodiments, two distributed detectors 125a, 125b at first domain control device 103 and at fifth control device 115 analyze the data stream at various devices in communication network 100 in the same subnetwork. For example, as shown in the first example embodiment, various detectors 124, 125, 126 analyze the data stream at different devices in communication network 100 in different subnetworks.

A defective or completely failed sensor is for example recognized when false data or no data are sent by the sensor. Defective components or manipulation by external sources causing faulty data can also be recognized. Timestamps, frequency of occurrence, or interval of occurrence of individual data packets are for example compared to a target value that characterizes a normal state. In general, a rule-based anomaly recognition is carried out that recognizes a deviation from a target value.

In a step 602, information about recognized anomalies is sent to the aggregation component by the recognition component. In a step 603, information about recognized anomalies is sent to the reaction component by the recognition component. In a step 604, the aggregation component aggregates received information about anomalies. If a plurality of detectors recognize an anomaly, their information is aggregated by the aggregator in step 604. The information can be evaluated, assigned a value or sorted by type of anomaly, and assigned to actuators. In a step 605, aggregated information about recognized anomalies is sent to the reaction component by the aggregation component. In a step 606, the reaction component initiates a countermeasure that is a function of the information about recognized anomalies.

A first aspect of the reaction relates to the direct reaction to a recognized anomaly. In step 603, a detector of the recognition component for example sends information about a recognized anomaly directly to an actuator of the reaction component via the second connection. In this way, the actuator directly receives information from the detector about a recognized anomaly. In the example, as a function of the information about the recognized anomaly, this actuator directly initiates a countermeasure for handling the anomaly.

A second aspect relates to an aggregation of information about anomalies and to a reaction on the basis of aggregated information. In this way, the actuator receives information about a recognized anomaly from the aggregator. In the example, as a function of the aggregated information about the recognized anomaly this actuator initiates a countermeasure for handling the anomaly. Thus, for example an anomaly that cannot be recognized by a single detector but that can be recognized on the basis of aggregated information from a plurality of detectors also results in a reaction.

For example, as shown in the third and fifth example embodiments, at least two aggregators 127, . . . , 134, situated at different devices in communication network 100, aggregate information about recognized anomalies. These aggregators can be realized hierarchically, for example in that aggregator 134 of a higher stage aggregates the information about recognized anomalies from aggregators 127, . . . , 133 of the lower stages.

For example, as shown in the fourth and fifth example embodiments, at least two actuators 135, . . . , 140 situated at different devices in communication network 100 initiate at least one countermeasure. These actuators can be situated in two different subnetworks of the communication network.

It can be provided that one of the actuators sends instructions about the countermeasure to a plurality of further actuators via communication network 100.

In an optional step 607, the aggregated information about recognized anomalies is sent to the communication component by the aggregation components. In an optional step 608, information about a reaction is sent to the communication component by the reaction component via a fifth connection.

In an example embodiment, the communication component is an interface that, in an optional step 609, communicates the recognized anomalies in particular to a backend. The communication component can also be designed to receive instructions in particular from a backend and to send them to the other component. In this case, connections in communication network 100 are realized in bidirectional fashion.

The connections take place via communication network 100. As a result, no separate hardware is required for the communication. For example, an automotive Ethernet network or a bus system such as a Controller Area Network (CAN) bus is used.

What is claimed is:

1. A method for handling an anomaly in a communication network, the method comprising:
performing, by each of a plurality of detectors, a rule-based anomaly recognition to:
identify a deviation of at least one parameter of a data packet of a data stream in the communication network from a target value; and
based on the identified deviation, recognize presence of at least one anomaly; and
the plurality of detectors sending information about the recognized at least one anomaly via the communication network;
aggregating, by at least one aggregator, the information about the recognized at least one anomaly sent from the plurality of detectors;
sending, to at least one actuator by the at least one aggregator via the communication network, the aggregated information about the recognized at least one anomaly; and
initiating, by the at least one actuator, at least one countermeasure for handling the recognized at least one anomaly, based on the aggregated information about the recognized at least one anomaly sent from the aggregator via the communication network;
wherein the plurality of detectors are situated at different devices in the communication network;
wherein the communication network, the plurality of detectors, the at least one aggregator, and the at least one actuator are situated in a motor vehicle wherein the at least one countermeasure includes: (i) modifying or rejecting at least one Ethernet packet, and/or (ii) blocking a port, and/or (iii) excluding a network participant.

2. The method of claim 1, wherein at least two of the plurality of detectors are in a same subnetwork of the communication network.

3. The method of claim 1, wherein the at least one actuator includes at least two actuators situated at different devices in the communication network.

4. The method of claim 1, wherein the at least one actuator includes at least two actuators, which are situated at different devices that are in different subnetworks of the communication network.

5. The method of claim 1, further comprising:
at least two aggregators situated at different devices in the communication network aggregating information about recognized anomalies; and
another aggregator aggregating the aggregated information of at least two aggregators.

6. The method of claim 1, further comprising an interface at least one of (a) communicating recognized anomalies to a backend and (b) receiving instructions from a backend.

7. The method of claim 1, wherein the data stream is between control devices within at least one subnetwork of the communication network.

8. The method of claim 1, wherein the data stream is between control devices of different subnetworks of the communication network that are connected to one another via a gateway or control device.

9. The method of claim 1, wherein a detector of the plurality of detectors is distributed over a plurality of control devices in the communication network.

10. The method of claim 1, further comprising an actuator of the as least one actuator sending instructions about at least one countermeasure to a plurality of other actuators via the communication network.

11. The method as recited in claim 1, wherein an aggregator of the at least one aggregator is distributed over a plurality of control devices in the communication network.

12. The method as recited in claim 1, wherein at least one of the plurality of detectors is situated in a gateway.

13. A non-transitory computer-readable medium on which are stored instructions that are executable by a processor and that, when executed by the processor, cause the processor to perform a method for handling an anomaly in a communication network, the method comprising:
performing, by each of a plurality of detectors, a rule-based anomaly recognition to:
identify a deviation of at least one parameter of a data packet of a data stream in the communication network from a target value; and
based on the identified deviation, recognize presence of at least one anomaly; and
the plurality of detectors sending information about the recognized at least one anomaly via the communication network;
aggregating, by at least one aggregator, the information about the recognized at least one anomaly sent from the plurality of detectors;
sending, to at least one actuator by the at least one aggregator via the communication network, the aggregated information about the recognized at least one anomaly; and
initiating, by the at least one actuator, at least one countermeasure for handling the recognized at least one anomaly, based on the aggregated information about the recognized at least one anomaly sent from the aggregator via the communication network;
wherein the plurality of detectors are situated at different devices in the communication network;
wherein the communication network, the plurality of detectors, the at least one aggregator, and the at least one actuator are situated in a motor vehicle
wherein the at least one countermeasure includes: (i) modifying or rejecting at least one Ethernet packet, and/or (ii) blocking a port, and/or (iii) excluding a network participant.

14. A device for handling an anomaly in a communication network, the device comprising:
a plurality of detectors, each of the plurality of detectors configured to:
perform a rule-based anomaly recognition to:
identify a deviation of at least one parameter of a data packet of a data stream in the communication network from a target value; and
based on the identified deviation, recognize presence of at least one anomaly; and
send information about the recognized at least one anomaly via the communication network; at least one aggregator configured to:
aggregate the information about the recognized at least one anomaly sent from the plurality of detectors; and
send, to at least one actuator by the at least one aggregator via the communication network, the aggregated information about the recognized at least one anomaly; and
the at least one actuator, wherein the at least one actuator in configured to initiate at least one countermeasure for handling the recognized at least one anomaly, based on the aggregated information about the recognized at least one anomaly sent from the aggregator via the communication network;

wherein the plurality of detectors are situated at different devices in the communication network; and wherein the communication network, the plurality of detectors, the at least one aggregator, and the at least one actuator are situated in a motor vehicle;

wherein the at least one countermeasure includes: (i) modifying or rejecting at least one Ethernet packet, and/or (ii) blocking a port, and/or (iii) excluding a network participant.

* * * * *